United States Patent
Reetz-Lamour et al.

(10) Patent No.: US 11,755,619 B2
(45) Date of Patent: Sep. 12, 2023

(54) TECHNIQUES FOR SELECTIVE COPYING OF FILE DATA OF A DATA SOURCE

(71) Applicant: SAP SE, Walldorf (DE)

(72) Inventors: Markus Reetz-Lamour, Walldorf (DE); Marlies Meessen, Sandhausen (DE); Marcel Kassner, Hockenheim (DE); PankajKumar Agrawal, Jamshedpur (IN); Christian Boehrer, Hoepfingen (DE); Nils Neff, Hueffenhardt (DE); Antonia Gross-Tarakji, Sinsheim (DE)

(73) Assignee: SAP SE, Walldorf (DE)

( * ) Notice: Subject to any disclaimer, the term of this patent is extended or adjusted under 35 U.S.C. 154(b) by 87 days.

(21) Appl. No.: 16/812,735

(22) Filed: Mar. 9, 2020

(65) Prior Publication Data
US 2021/0232602 A1   Jul. 29, 2021

(30) Foreign Application Priority Data
Jan. 23, 2020   (IN) .............................. 202011003018

(51) Int. Cl.
*G06F 16/27*   (2019.01)
*G06F 16/242*   (2019.01)
*G06F 16/2457*   (2019.01)
*G06F 16/23*   (2019.01)

(52) U.S. Cl.
CPC ........ *G06F 16/278* (2019.01); *G06F 16/2358* (2019.01); *G06F 16/2433* (2019.01); *G06F 16/24573* (2019.01)

(58) Field of Classification Search
CPC ............. G06F 16/278; G06F 16/24573; G06F 16/2433; G06F 16/2358
See application file for complete search history.

(56) References Cited

U.S. PATENT DOCUMENTS

| 9,596,291 | B1 * | 3/2017 | Basva ...................... H04L 67/06 |
| 2009/0313702 | A1 * | 12/2009 | Mandava ................ G06F 16/16 726/27 |
| 2011/0178998 | A1 * | 7/2011 | Nizami ................... G06F 16/27 707/694 |
| 2011/0320473 | A1 * | 12/2011 | Desmond .............. G06F 16/119 707/769 |
| 2015/0006490 | A1 * | 1/2015 | Balasubramanian ....................... G06F 16/2365 707/690 |
| 2019/0258726 | A1 * | 8/2019 | Vallejo ................ G06F 16/1827 |

* cited by examiner

*Primary Examiner* — Mark D Featherstone
*Assistant Examiner* — Ranjit P Doraiswamy
(74) *Attorney, Agent, or Firm* — Klarquist Sparkman, LLP

(57) ABSTRACT

Techniques and solutions are described for copying data from a source client to a target client. It may be selected, such as by a user, whether a full copy or a partial copy of a set of source client data should be made. If a partial copy is selected, a set of file types is provided. The file types can be used to define files that should be included in, or excluded from, the copy. A data source of the source client is analyzed to determine data associated with a file type that is to be included in a copy, or is associated with a file type that is not indicated as to be excluded from the copy. The determined data is copied from the source client to the target client.

20 Claims, 13 Drawing Sheets

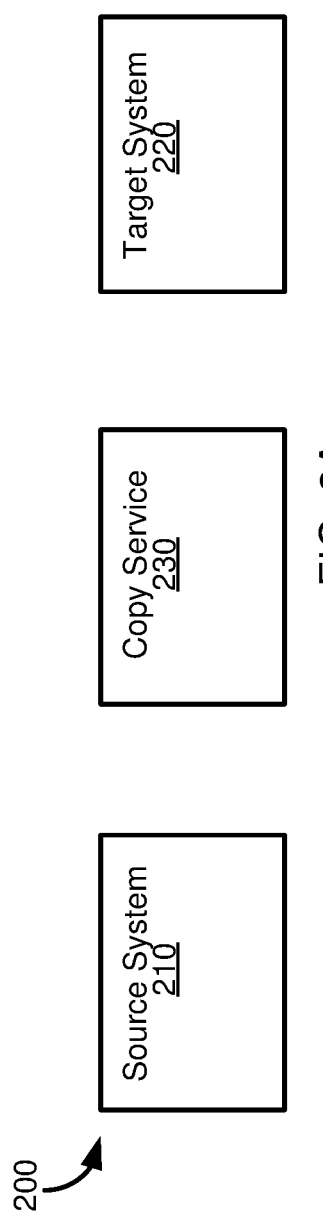
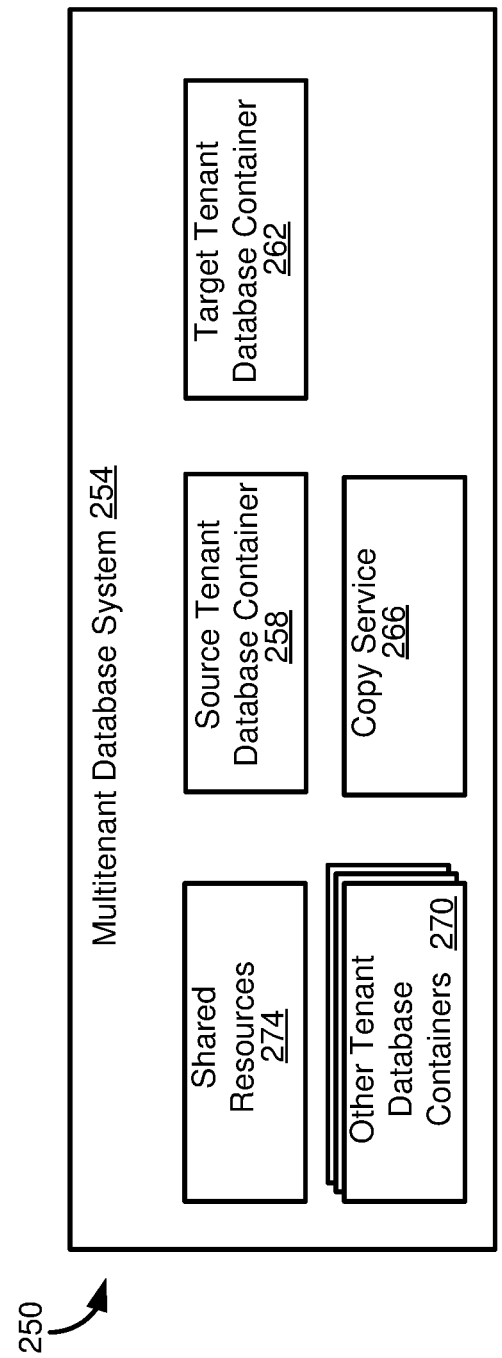

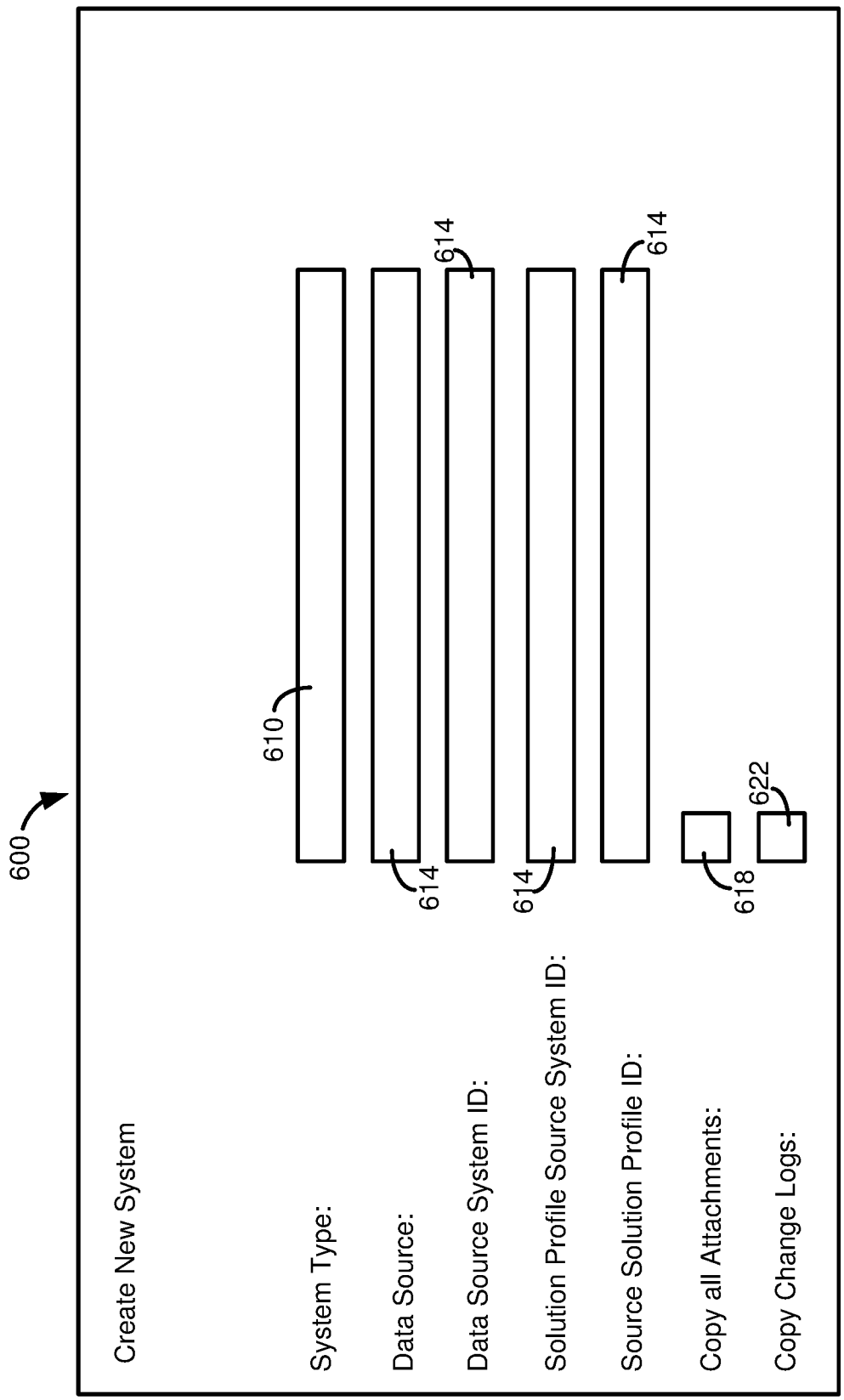

| Table Name | Table Group | Class | Component |
|---|---|---|---|
| TABLE_A | ATT | CL_COPY_A | COMP_A |
| TABLE_B | ATT2 | CL_COPY_B | COMP_B |
| TABLE_C | ATT1 | CL_COPY_C | COMP_C |
| TABLE_D | ATT | CL_COPY_D | COMP_D |
| TABLE_E | ATT2 | CL_COPY_E | COMP_E |
| TABLE_F | ATT1 | CL_COPY_F | COMP_F |
| TABLE_G | ATT | CL_COPY_G | COMP_G |
| TABLE_H | ATT2 | CL_COPY_H | COMP_H |

```
OPEN CURSOR WITH HOLD cv_cursor FOR
  SELECT T1~<keyfield_name> AS t1          — 806
    FROM <tabname> AS t1                    — 808
    [ INNER JOIN <table with document_type> AS t2  — 812
      ON <join condition> ... ]             — 816
    USING CLIENT mv_client_src
  WHERE ... IN mt_rng_doc_type
  [ AND <additional where condition> ].     — 824
                                            — 820
```

FIG. 8 — 850

```
data(lv_comp) = [T1~TABLE_F_UUID].
OPEN CURSOR WITH HOLD cv_cursor FOR
  SELECT (lv_comp)
    FROM TABLE_F AS t1
    INNER JOIN TABLE_H AS t2
      ON t2~TABLE_F_uuid = t1~TABLE_F_uuid
    USING CLIENT mv_client_src
  WHERE t2~document_type IN mt_rng_doc_type
    AND t2~current_vrs = 'X'.
```

FIG. 9 — 900

```
SELECT *                                    — 908
  FROM <table> AS t1                        — 912
  USING CLIENT mv_client_src
  FOR ALL ENTRIES IN it_tab_key
  WHERE rsrc_uuid = it_tab_key-table_line.
```

FIG. 9 — 950

```
SELECT *
  FROM TABLE_F AS t1
  USING CLIENT mv_client_src
  FOR ALL ENTRIES IN it_tab_key
  WHERE TABLE_F_uuid = it_tab_key-table_line.
```

FIG. 10 — 1000

```
INSERT <table>                              — 1010
  USING CLIENT mv_client_trg
  FROM TABLE it_tab_content
  ACCEPTING DUPLICATE KEYS.
```

FIG. 10 — 1050

```
INSERT TABLE_F
  USING CLIENT mv_client_trg
  FROM TABLE it_tab_content
  ACCEPTING DUPLICATE KEYS.
```

TECHNIQUES FOR SELECTIVE COPYING OF FILE DATA OF A DATA SOURCE

CROSS REFERENCE TO RELATED APPLICATIONS

This application claims priority to India Provisional Patent Application No. 202011003018, filed on Jan. 23, 2020, which is hereby incorporated herein by reference.

FIELD

The present disclosure generally relates to copying data between computer systems, or components of a computer system. Particular implementations relate to data sources that contain files, and selectively copying data for, or that references, particular file types.

BACKGROUND

Database systems are important parts of many computing environments. Database systems can be used to store structured data, such as data organized into tables in a relational database system. Database systems can also store unstructured information, including documents, images, and other types of files. In some cases, this type of unstructured data can be in the form of an attachment, such as an attachment to structured data, including structured data that may be associated with a logical data object (for example, an instance of a class or similar type of abstract or composite data type).

Database systems, particularly enterprise level database systems, can store vast amounts of information. In many cases, a large portion of the data volume is in the form of attachments or other files, rather than structured data. Thus, when a database is to be copied, the time and computing resources needed to accomplish the copy can be very significant. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for copying data from a source client to a target client. It may be selected, such as by a user, whether a full copy or a partial copy of a set of source client data should be made. If a partial copy is selected, a set of file types is provided. The file types can be used to define files that should be included in, or excluded from, the copy. A data source of the source client is analyzed to determine data associated with a file type that is to be included in a copy, or is associated with a file type that is not indicated as to be excluded from the copy. The determined data is copied from the source client to the target client.

A method is provided for copying selected data from a source client to a target client. A request is received to copy data from a source client to a target client to provide a copy of at least a portion of data stored for the source client. The request includes an indication that, for a first data source associated with the source client, at least certain types of files should be excluded from data copied from the source client.

A first set of file types that should be included in the copy is determined. The first data source of the source client is analyzed. First data in the first data source that is not associated with a file is determined. Contents of the first data are copied to the target client. Second data in the first data source that is associated with a file type that is in the first set of file types is determined. Contents of the second data are copied to the target client. Third data in the first data source that is associated with a file type that is not in the first set of file types is determined. Contents of the third data are not copied to the target client.

According to another embodiment, another method is provided for copying selected data from a source client to a target client. A request is received to copy data from a source client to a target client to provide a copy of at least a portion of data stored for the source client. The request includes an indication that, for a first data source associated with the source client, at least certain types of files should be excluded from data copied from the source client. The request also includes an indication that change logs should be included in data copied from the source client to the target client, which overrides a default action of not copying change logs.

A first set of file types that should be included in the copy is determined. The first data source of the source client is analyzed. First data in the first data source that is not associated with a file is determined. Contents of the first data are copied to the target client. Second data in the first data source that is associated with a file type that is in the first set of file types is determined. Contents of the second data are copied to the target client. Third data in the first data source that is associated with a file type that is not in the first set of file types is determined. Contents of the third data are not copied to the target client. Change logs are copied from the source client to the target client.

According to an additional aspect, a further example method is provided for copying selected data from a source client to a target client. A request is received to copy data from a source client to a target client to provide a copy of at least a portion of data stored for the source client. The request includes an indication that, for a first data source associated with the source client, at least certain types of files should be excluded from data copied from the source client.

A first set of file types that should be included in the copy is determined. The first data source of the source client is analyzed. First data in the first data source that is not associated with a file is determined, using custom logic defined for the first data source. Contents of the first data are copied to the target client. Second data in the first data source that is associated with a file type that is in the first set of file types is determined, using the custom logic defined for the first data source. Contents of the second data are copied to the target client. Third data in the first data source that is associated with a file type that is not in the first set of file types is determined, using the custom logic defined for the first data source. Contents of the third data are not copied to the target client.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2A is an example computing environment in which disclosed technologies can be implemented, where a source client and a target client are separate computing systems.

FIG. 2B is an example computing environment in which disclosed technologies can be implemented, where a source client and a target client are tenants of a multitenant database system.

FIGS. 6A and 6B are example user interface screens illustrating how a partial copy of source client data can be specified.

FIG. 7 is a table illustrating how information can be recorded specifying particular processing logic to be used with a table to be evaluated for copying, and how tables can be grouped together to improve consistency of copy results.

FIG. 8 provides example query language statements that can be used to determine records of a source client that should be included in a copy.

FIG. 9 provides example query language statements that can be used to retrieve records for keys determined using a query language statement of FIG. 8.

FIG. 10 provides example query language statements that can be used to store in a target client data retrieved using a query language statement of FIG. 9.

DETAILED DESCRIPTION

Example 1—Overview

Figure 1:
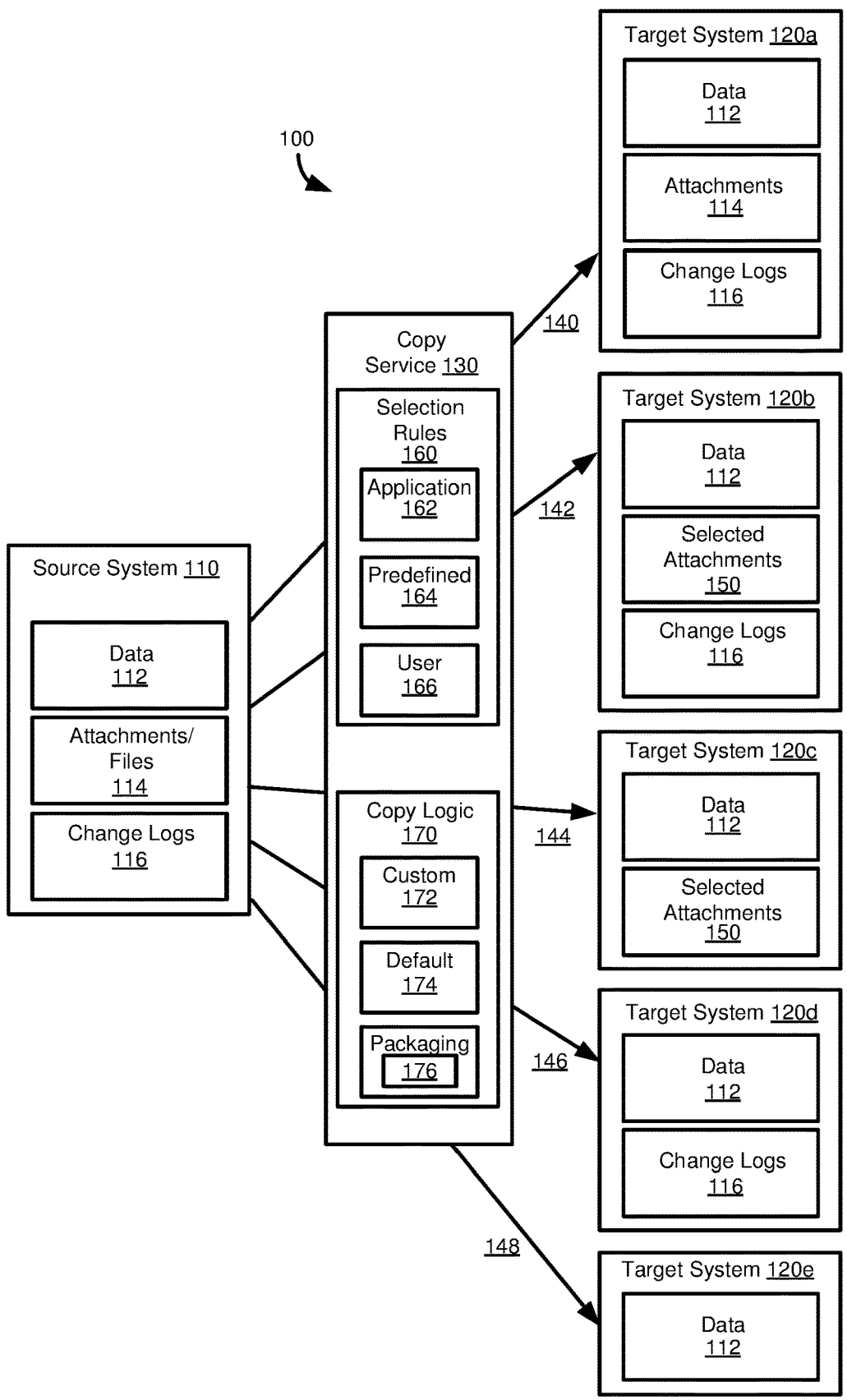
FIG. 1 is a schematic diagram illustrating a computing environment in which disclosed technologies can be implemented, and various copy scenarios that can be carried in the computing environment.

Database systems are important parts of many computing environments. Database systems can be used to store structured data, such as data organized into tables in a relational database system. Database systems can also store unstructured information, including documents, images, and other types of files. In some cases, this type of unstructured data can be in the form of an attachment, such as an attachment to structured data, including structured data that may be associated with a logical data object (for example, an instance of a class or similar type of abstract or composite data type). In a particular, the logical data object is a BusinessObject, as used in products available from SAP SE, of Walldorf, Germany.

Database systems, particularly enterprise level database systems, can store vast amounts of information. In many cases, a large portion of the data volume is in the form of attachments or other files, rather than structured data. Thus, when a database is to be copied, the time and computing resources needed to accomplish the copy can be very significant. Accordingly, room for improvement exists.

In typical existing technologies, relatively low-level database tools or commands are used to make copies of data in a database system. For example, the tools or commands can be used to copy an entire database, or selected tables in a database system. However, the tools or commands are typically not sufficiently sophisticated to include or exclude particular types of data.

In some scenarios, it may be desirable to make a copy of at least a portion of a database system. For example, it may be desired to test new software or configuration settings with actual data that would be used if the software was installed or a configuration setting applied. However, such testing may not require all data in a database system. Structure data, such as in relational database tables, may be sufficient for testing purposes, without including at least certain types of files. Thus, making a copy of all data in a database system for testing purposes, or even of a more limited set of database tables, may result in spending significant time and computing resources (e.g., storage, network, processor) in copying file data that is not needed for testing purposes (or another purpose for which the copy is being made).

The present disclosure provides for improved methods of copying all or a portion of a database system. In some cases, a database system refers to a particular tenant of a multi-tenant database system. The multitenant database system can include shared or system data, which is not specific to a particular tenant, and can include data that is specific to specific tenants. Particularly if the multitenant database system includes shared resources (e.g., standard tables used by a software application), making a copy of a database system can include copying all or a portion of data for a particular tenant. However, disclosed technologies are not limited to multitenant database systems, and are not limited to copying data for any particular purpose, such as testing.

Disclosed technologies allow particular types of files to be specified to be included in a copy, excluded from a copy, or a combination thereof. That is, particular types of files can be specified as being included in a copy, and other types of files can be excluded by default. Or, particular types of files can be specified as being excluded from a copy, and other types of files can be included in the copy by default. In a further implementation, file types to included in a copy and file types to be excluded from a copy can both be specified.

Specifying one or both of file types to be included in, or excluded from, a copy can be accomplished in various ways. In one way, an application associated with a copy request can include logic that specifies file type handling for a copy operation (or a particular type of copy operation). The application can also specify particular objects (e.g., in an object oriented language, such as abstract or composite data types) where attachments/files associated with such objects should (or should not) be copied.

In another way, a user can manually select how particular file types will be handled during a copy. In some cases, this manual selection can be used to change default selections (which can be for specific file types, or can be used to change default behavior of including or excluding all file types). A yet further way of specifying file types involves a predetermined selection of file types to be included in a copy or excluded from a copy. Predetermined file types to include in/exclude from a copy can be based on satisfying the expectations of users of the copy. For example, some types of files may be stored as attachments in a database system, even though users may not think of such content as files/attachments. For example, images of products or employees may be stored as attachments, but may be integrated into content presented to a user, as opposed to being attachments that must be separately selected/opened by a user.

When a copy is initiated, a user may select whether a copy is to be a full copy or a partial copy. As discussed above, in at least some cases, when a partial copy is selected, a user can choose which file types to include in/exclude from a copy. A user can be provided with other options, such as an option to exclude all files from a copy.

Attachments can be stored in tables in different ways. Thus, evaluating what data should be included in a copy for a first table may be carried out in a different manner than evaluating data that should be included in a copy for a second table. Disclosed technologies provide for implementing custom table logic to determine what data from a table should be included in a copy. Default logic can be provided for cases where no custom logic is available. Default logic can include logic such as copying all data in a table, not copying any data in a table, or copying data that is not associated with a file.

Tables can be grouped together for consistency of processing. Grouping tables can be useful when multiple tables may contain or reference the same file. Grouping tables can thus help avoid inconsistent results, such as having a table copied which references a file, but the file was not included in a copy.

Data copy jobs can involve large amounts of data, even when at least some file types are excluded from a copy. Disclosed embodiments can include a feature where a package size can be set. Data to be copied (e.g., sent from a source system to a target system) can be apportioned into multiple packages. An option can be provided to enable or disable data packaging. Similarly, data packaging can be activated or deactivated based on different criteria, such as the size of a copy job or particular data being copied (e.g., if only structured data is being copied or if a copy also includes files).

Techniques similar to those described above can be used for other types of data associated with a copy process. For example, similar techniques can be used to determine whether or not change logs should be included in a copy. In a particular implementation, a user can select to initiate a full copy or a partial copy. If a partial copy is selected, at least certain types of files, and change logs, are omitted from a copy.

Disclosed technologies can provide various advantages. As files and change logs can constitute a substantial portion of database data, and may not be needed for an intended use of the copied data, disclosed technologies can reduce the amount of data included in a copy. Reducing the volume of data to be copied can reduce storage requirements on a system on which the copy will be located, and can reduce computing resources (e.g., processor, network, storage input/output operations) used in producing a copy. In cases where a predetermined selection of file types to include in/exclude from a copy is provided, and a user can select whether to make a full or partial copy, a partial copy can exclude the predetermined file types and can exclude change logs from a copy.

Example 2—Example Copy Scenarios

FIG. 1 schematically represents a computing environment 100 in which disclosed technologies can be implemented. The computing environment 100 shows various scenarios for copying data from a source system (or client or tenant) 110 to a target system (or client or tenant) 120 (shown as target systems 120a-120e). Although shown as separate systems, the source system 110 and the target system 120 can be on the same computing system. For example, the source system 110 and the target system 120 can be part of a multitenant database system, and can represent different tenants of such database system.

The copying of data can be facilitated by a copy service 130. Although shown as separate from the source system 110 and the target system 120, the copy service 130 can be integrated into a computing system that also includes one or both of the source system or the target system.

The source system 110 can include data 112, which can be structured data (e.g., data in relational database tables, or another structured format) or data in a semi-structured format (such as a tagged key-value store). The source system 110 can also include files 114, which can be in the form of attachments (e.g., a file that is linked to other data, including data in the data 112). The files 114 can have various types. In some cases, a file type can be indicated by an extension for the file (e.g., ".jpg", ".docx", ".eml"), and including or excluding files from a copy can be based on evaluating file extensions.

Files 114 can be associated with metadata, including metadata stored in the data 112. Such metadata can be used, alone or in combination with other information, such as file extensions, to determine files 114 to be included in, or excluded from, a copy. As an example, it could be that only certain types of image files, documents, or emails should be included in a copy, and such information may be determined from metadata. However, even in such cases, it can be useful to use file extensions or similar information as a coarse filter for determining files 114 to be copied.

The source system 110 can include change logs 116. Change logs 116 can represent information regarding when aspects of the data 112 (or optionally the files 114) were modified. Change logs 116 can include information such as a type of modification made (e.g., new, deletion, modification), a date associated with a change, an identifier of a user, process, or system associated with a change, or data associated with different data versions (e.g., maintaining a copy of a deleted record or a prior version of a modified record).

Note that while the files 114 and change logs 116 are shown separate from the structured data, the files and change logs can be incorporated into data 112. For example, the change logs 116 are also a form of structured data, but differ from the data 112 by virtue of being change logs. Similarly, records that include or refer to files 114 can be included in the data 112, but differ from the data 112 in that the data 112 does not reference or include files.

The target systems 120, in the different copy scenarios, can include all or a portion of the data 112, the files 114, or the change logs 116 of the source system 110. Or, at least some of such information from the source system 110 can be omitted from a copy produced on a target system 120. The nature of the information copied to a target system 120 can be based at least in part on settings for a copy process, such as a copy process facilitated or managed by the copy service 130.

Scenario 140 represents a full copy—the entire contents (or at least a portion selected for copying) of the source system 110 have been copied to the target system 120a. Scenario 140 can occur, for example, when a user or process selects to fully copy of the source system 110 made rather than making a partial copy.

Scenario 142 represents a first type of partial copy. In the target system 120*b*, the data 112 (or portions selected for copying) has been copied from the source system 110, as well as the change logs 116. However, only a selected portion 150 of the files 114 have been copied to the target system 120*b*. In scenario 144, the data 112 and the selected portions 150 of the files 114 have been copied to the target system 120*c*, but the change logs 116 have not been copied. In scenario 146, the data 112 and the change logs 116 have been copied, but no files 114 have been copied. In scenario 148, only the data 112 has been copied, and no files 114 or change logs 116 have been copied.

As will be further discussed, the determination of which scenario of scenarios 140, 142, 144, 146, 148 occurs can be based on a type of copy, such as full or partial copy, selected by a user or process. That is, the copy of scenario 140 can be carried out when a full copy is to be made, otherwise one of scenarios 142, 144, 146, 148 occurs. When a partial copy is selected, which of scenarios 142, 144, 146, 148 occurs can depend on specific configuration parameters provided for a copy request, or default parameters defined for a partial copy.

The copy service 130 can include selection rules 160 that can be used at least in part to determine what information is included in a partial copy (e.g., scenarios 142, 144, 146, 148). As discussed in Example 1, selection rules 160 can come from various sources (and in some cases, a combination of sources), including from logic associated with an application 162, predefined logic 164 for the copy service 130, or based on user input 166.

The copy service 130 can include copy logic 170. The copy logic 170 can be used at least in part to implement a copy, including the selection rules 160 applicable for a given copy process. The copy logic 170 can include custom logic 172, which can be logic for specific data to be copied, such as logic for a specific database table. In at least some cases, custom logic 172 is manually defined.

The copy logic 170 can include default logic 174. The default logic 174 can be used when custom logic 172 is not specified for a data source (e.g., table) being copied. In some cases, the default logic 174 can be to copy all information from the data source, while in other cases the default logic can be to exclude all information from the data source.

The copy logic 170 can include packaging logic 176. The packaging logic 176 can be used to determine how data is transferred from the source system 110 to a target system 120. In particular, when data is transferred over a network connection, it can be useful to control a maximum size of a data package that is sent from the source system 110 to a target system 120. Packaging logic 176 can include criteria to determine when packaging is needed, such as not packaging structured (e.g., table) data, but packaging files associated with structured data and included in a copy process. Or, packaging logic 176 can use a fixed amount of data (e.g., records or keys) for some types of data, such as structured data that does not include file data, but adjust packages based on actual package size for other types of data (e.g., data that contains file data).

Note that, in a given copy scenario 140, 142, 144, 146, 148, each type of data copied in part, copied in full, or not copied can correspond to a single table or can correspond to multiple tables. For example, in scenario 142, the data 112 can correspond to multiple tables, the selected attachments 150 can be from multiple tables (and multiple tables in the files 114 may not have been included in the selected attachments), and the change logs 116 can be from multiple tables.

Example 3—Example Computer Environments

FIGS. 2A and 2B illustrate additional computing environments 200, 250 in which disclosed technologies can be implemented. FIG. 2A illustrates a source system 210 and a target system 220 as separate computing systems, where a copy process is managed at least in part by a copy service 230. The source system 210, target system 220, and copy service 230 can be at least analogous to the corresponding components 110, 120, 130 of FIG. 1. Although shown as independent, in some cases, the copy service 230 can be part of the source system 210 or the target system 220. Further, although shown as separate systems, in other embodiments the source system 210 and the target system 220 may be part of a common computing system.

FIG. 2B illustrates a multitenant database system 254 that includes a source tenant database container 258 and a target tenant database container 262. The source tenant database container 258 can correspond to the source system 110 of FIG. 1, and the target tenant database container 262 can correspond to the target system 120. The multitenant database system 254 includes a copy service 266, which can correspond to the copy service 130. The multitenant database system 254 can include additional tenant database containers 270, which can be database containers that are not involved in a copy process between the source tenant database container 258 and the target tenant database container 262.

The multitenant database system 254 can include shared resources 274. In some cases, shared resources 274 are not included in a process that copies data from the source tenant database container 258 to the target tenant database container 262. For example, any data in the shared resources 274 that was accessible to the source tenant database container 258 can be made available to the target tenant database container 262, so that such data need not be copied.

Example 4—Example Database Schema

Figure 3:
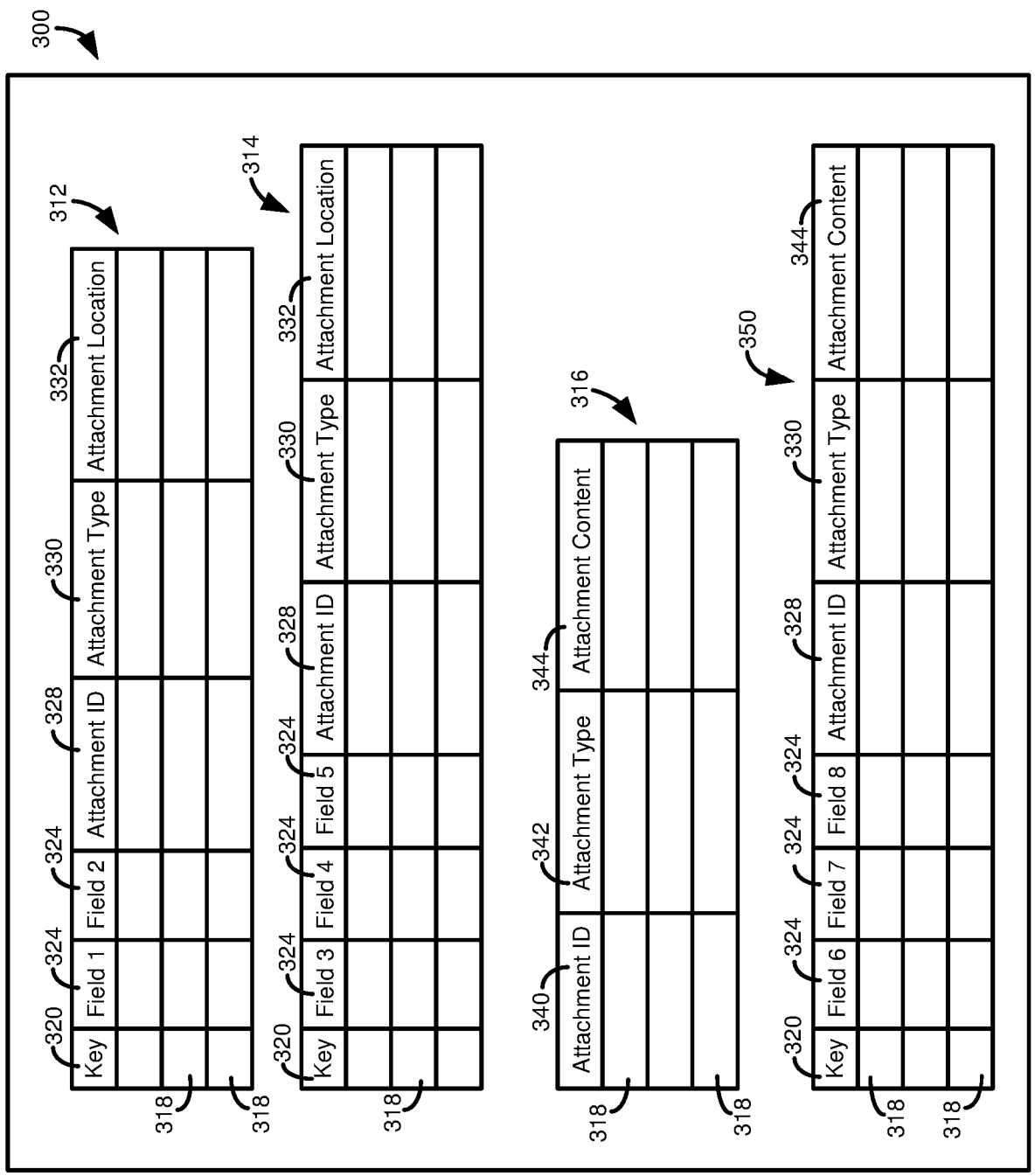
FIG. 3 an example database schema illustrating how disclosed technologies can be used to selectively copy data from a source client.

FIG. 3 illustrates an example database schema 300 that can be used to store structured data and files. The schema 300 includes two example tables 312, 314 that refer to attachments, and a table 316 that is specific for attachments. Note that the table 316 includes attachment content, and so is considered file data (e.g., files 114 of FIG. 1), even though to some extent it could be considered structured data since it is maintained in a table.

Each table 312, 314 includes a key field 320 (i.e., which serves as a primary key for the table) and one or more other fields or attributes 324. The fields 324 do not specifically describe any files that may be associated with a record 318 of a respective table 312, 314.

The tables 312, 314 include fields 328, 330, 332 which describe any files (attachments) that may be associated with a particular record 318. Field 328 provides an identifier for the file. The identifier can be a name, such as a file name. In other cases, the identifier can be a foreign key value for the file, such as identifying a particular primary key value for the table 316. The primary key value for the file can be an artificially assigned/generated key value (e.g., a UUID).

Field 330 can provide a type for the file (attachment) referenced by a given record 318 of a table 312, 314. The value provided in the file type 330 can correspond to an extension for the file (e.g., ".docx", ".pdf") or can provide other information regarding the content, nature, or intended usage of a file. The other information can include custom defined information and can be more granular than information provided by the file extension. For example, various files may have the extension ".jpg". Even though all of the files are image files, the images can represent different things. In this example, field 330 can indicate whether the images are employee images, product images, images of scanned documents, uncategorized images, etc. As will be further described, information in the field 330, or analogous fields/information, can be particularly useful in defining and executing copy processes that copy only a selected portion of files.

The field 332 can provide a location for the file. The location can be a URI or other identifier of a file location. In some cases, the value provided in the field 332 can identify a particular table in which file content is stored. When file content is stored in a table, such as the table 316, the value provided in the field 332 can represent an original location of the file.

The table 316 is shown with fields 340, 342, 344 that provide values for various attributes of files, which can include files referenced by one or both of the tables 312, 314. The field 340 can provide a file identifier, which can correspond to the file identifier field 328. The field 342 can provide a file type. In some cases, the file type can correspond to the field 330. In other cases, the field 342 can be used to categorize or describe the file in a way that is different than how the file is categorized or described by the field 330. For example, the field 330 can include a more granular or custom description of the file, while the field 342 can include a more general description of the file, such as a general type (image, document) or a file extension.

Having the field 342 be used in a different manner than the field 330 can be particularly useful when different tables that reference the file (e.g., tables 312, 314) have different values associated with their respective field 330. For example, one table 312 may refer to a file as a product image with a corresponding value in its field 330, while another table 314 may refer to a file as a component image or an uncategorized image with an appropriate value in its field 330.

The field 344 can include content associated with the file, which can correspond to the format of the file. Examples of file formats that can be used for the field 344 include XML, CSV, text, JSON, BFILE, or various types of LOB formats, such as BLOB, CLOB, or NCLOB.

It should be appreciated that disclosed technologies are not limited to any specific schema 300. For example, the file location field 332 can be omitted from tables 312, 314. Or, the attachment type field 342 can be omitted from the table 316. A given table 312, 314, 316 can include additional fields that describe various properties of a file (e.g., date created, date modified, user who added the file, database or computing system that added a record or link to a file, etc.). In addition, rather than having a single key field 320, a table 312, 314 can include a key that is constructed from multiple fields of the table, and the key need not be an artificially generated or assigned value.

In addition, although tables 312, 314, 316 illustrate having file content 344 separate from records 318 that reference the file, other arrangements are possible. Table 350 has fields 324 that are analogous to fields 324 of tables 312, 314, 316. However, in this case the file content 344 is included in the same table 350 as fields 324 that do not specifically describe the file whose content is included with a given record 318. The table 350 can include a file identifier field 328 and an attachment type field 330, which can be analogous to the fields discussed in conjunction with tables 312, 314.

Figure 4:
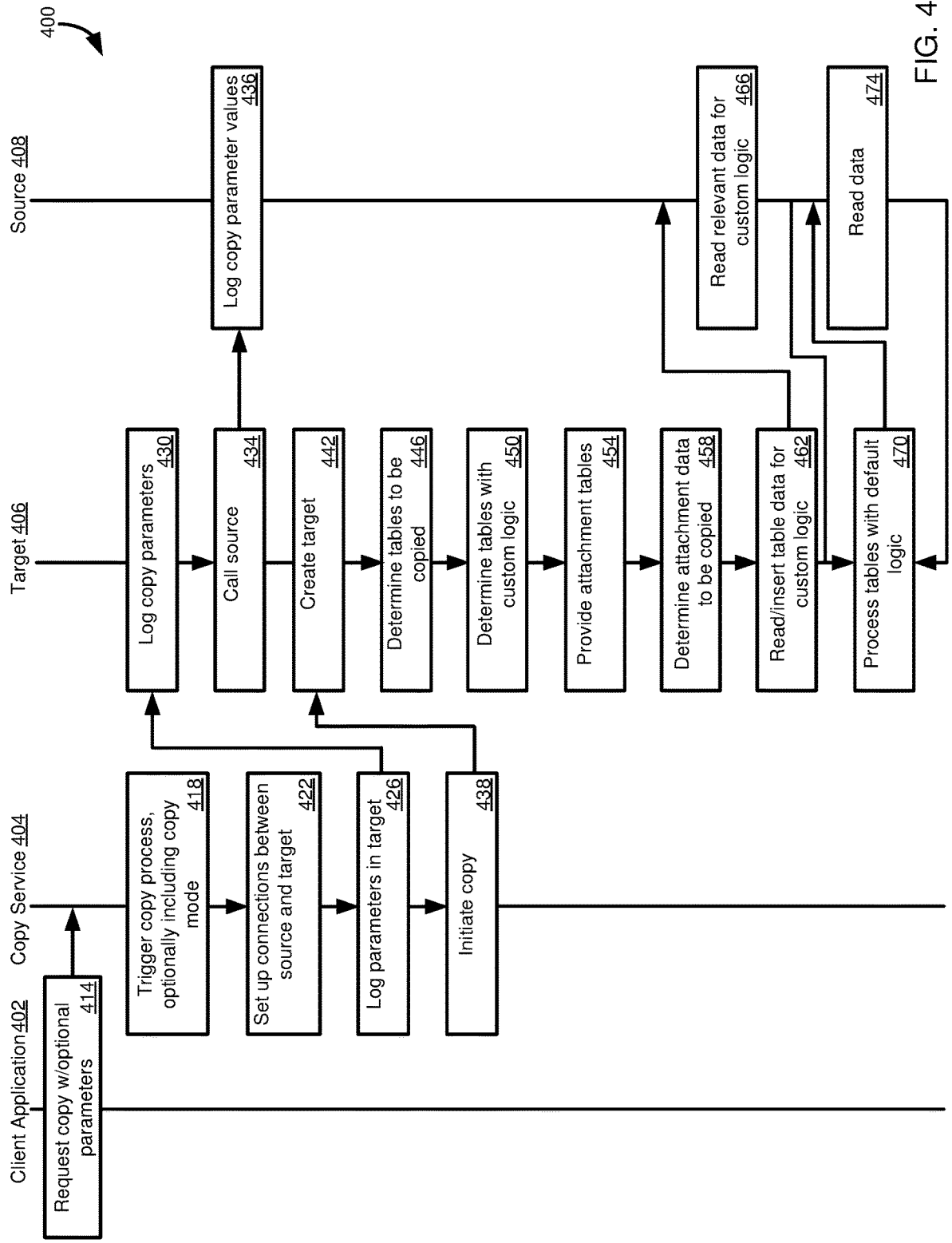
FIG. 4 is a timing diagram illustrating operations by a client, a copy service, a target client, and a source client in an example process for selectively copying data from the source client.

Example 5—Example Operations with Target Client, Source Client, and Copy Service FIG. 4 illustrates a process 400 for performing a partial copy of all or a portion of a database, such as all or a portion of a particular tenant database in a multitenant database system. Actions in the process 400 are shown as carried out by a client application 402, a copy service 404, a target client 406, and a source client 408. The copy service 404, target client 406, and source client 408 can correspond, respectively, to the copy service 130, target system 120, and source system 110 of FIG. 1.

At 414, the client application 402 sends a request to the copy service 404 to initiate a copy. The request can be triggered by a process of the client application 402, or can be in response to specific user input to initiate a copy. In some cases, all copy requests are sent to the copy service 404, in other cases only requests to partially copy a data set from the source client 408 to the target client 406 are sent to the copy service.

The copy service 404 initiates a copy process at 418. Initiating a copy process can include setting a parameter setting a copy mode. A copy mode can have a default value, such as to make a particular copy using a default set of parameters (e.g., files to include or exclude). Thus, initiating a copy process at 418 can include changing the default value to indicate that a full copy is desired, such as in response to information included in the request generated by the client application 402 at 414. In other implementations, setting a copy mode can include receiving particular file types, or other values for metadata that describes particular files that should be included in, or excluded from, a copy.

At 422, the copy service 404 can set up connections between the target client 406 and the source client 408. These connections can be remote (e.g., based on a remote function call (RFC)), particularly when the target client 406 and the source client 408 are located on different computer systems. Copy process parameters are sent to the target computing client at 426. The process parameters can include an identifier for a particular copy job, parameters defining a copy job, including identifying tables to be included in the copy, settings for information to be included in (or excluded from) a copy, an identifier for the source client 408, optionally an identifier for a particular client whose data should be copied (which can be particularly useful when data for multiple clients may be stored together, such as in a multi-tenant database system), and optionally information to allow the target client 406 to connect to the source client 408.

At 430, in response to receiving process parameters sent from the copy service 404 at 426, the target client 406 can store the process parameters. The target client 406 can set up a connection with the source client 408 at 434, such as using an RFC (which can optionally be based on information sent by the copy service 404 at 426). Also, at 434, the target client 406 can send copy process parameters to the source client 408, which can store (log) the parameters at 436. In other implementations, the copy service 404 can send process parameters to the source client 408, such as during 426.

The copy service 404 can initiate the copy process at the target client 406 at 438. At 442, the target client can create database artefacts needed for the copy process. The database artefacts can include a specific container to receive data from the source client 408. In other cases, data from the source client 408 may be added to an existing container (or schema) of the target client. In this case, 442 can be omitted.

Tables to be copied are determined by the target client 406 at 446. In some cases, the tables to be copied can be all tables of the source client 408. In other cases, only a subset of tables is to be copied, and such subset can be included in the client request generated at 414, or can be determined from other information associated with the client request. For example, if the client request was generated from a particular application, or from a particular process or UI screen of the application, this information can be used to determine tables to be copied. In the case of an ERP application that provides broad functionality, a request from a "CRM" process or screen may result in customer data being copied, while a request from an "employees" process or screen results in data related to employees being copied. A repository, such as a data dictionary, can be used to maintain information about particular tables that are associated with particular applications, or particular application processes or application subject matter areas. The information in the repository can be used, at least in part, to determine which tables are responsive to a particular copy request.

At 450, the target client 406 can determine which tables may require specialized processing as part of a copy process. For example, if particular logic has not been defined for a table, it can be handled differently than for tables for which particular logic has been defined. Tables without particular logic, for example, may simply be copied to the source client 408 in their entirety. Thus, tables identified at 450 with custom logic can be specified to not be included in a standard copy process (e.g., which copies all table data).

Determining at 450 tables that may require specialized processing can also include determining tables that include, or reference, files or attachments. In some cases, such information may be included in metadata associated with a table, or can be determined from particular fields used with a table, including data types associated with such fields. A table with a field having a BLOB datatype, for instance, may be identified as including files, and thus potentially requiring specialized handling. Tables that reference this table, such as via a foreign key relationship or association, can also be identified for specialized handling, as changes to one table (e.g., deletion of rows) may affect the integrity of a table that references such table.

Tables with files can optionally be provided for a copy process at 454. For example, if a user has selected to make a complete copy of relevant data, even tables with files, or that reference files, all source data can be copied in its entirety. 454 can also include determining particular tables with file information that are relevant to a given copy request. If the copy request specified that documents should be included in the copy, but not other types of files, 454 can include determining tables that include document information, and providing those for a copy process, but excluding tables that include information for other types of files. Similarly, if only images of a particular type, such as product images, are selected to be copied, 454 can include determining tables that include files that represent product images, making those tables available, but not making available tables that include non-image file types or which have image files, but the images are not identified as product images.

At 458, the process 400 can determine what data should be included in a copy from tables that are designated as being subject to partial copy settings. For example, 458 can access logic for particular tables that can be used to determine data on the source client 408 that meets copy criteria.

The target client 406 can communicate with the source client 408 at 462, where the source client, at 466 determines data that should be sent to the target client 406 and then sends the appropriate data. The data can then be stored in the target client at 462.

In a specific implementation, keys for records meeting copy criteria are tracked or stored, and later used to copy data associated with such records from the source client 408 to the target client 406. Identifying and separately sending data from the source client 408 to the target client 406 can be useful when the data volume to be transferred is large, and may require dividing data into multiple packages that are sent from the source client to the target client.

At 470, data for tables without custom logic, or which have otherwise been designated to be copied in full is obtained from the source client 408 (which provides the requested data at 474) and inserted into the appropriate tables in the target client.

Various changes can be made to the process 400. In particular, certain actions described as performed by the target client 406 can be performed by the copy service 404. For example, one or more of the actions at 446, 450, 454, 458, and requesting data from the source client 408 at 462, 470 can be carried out by the copy service 404.

Figure 5:
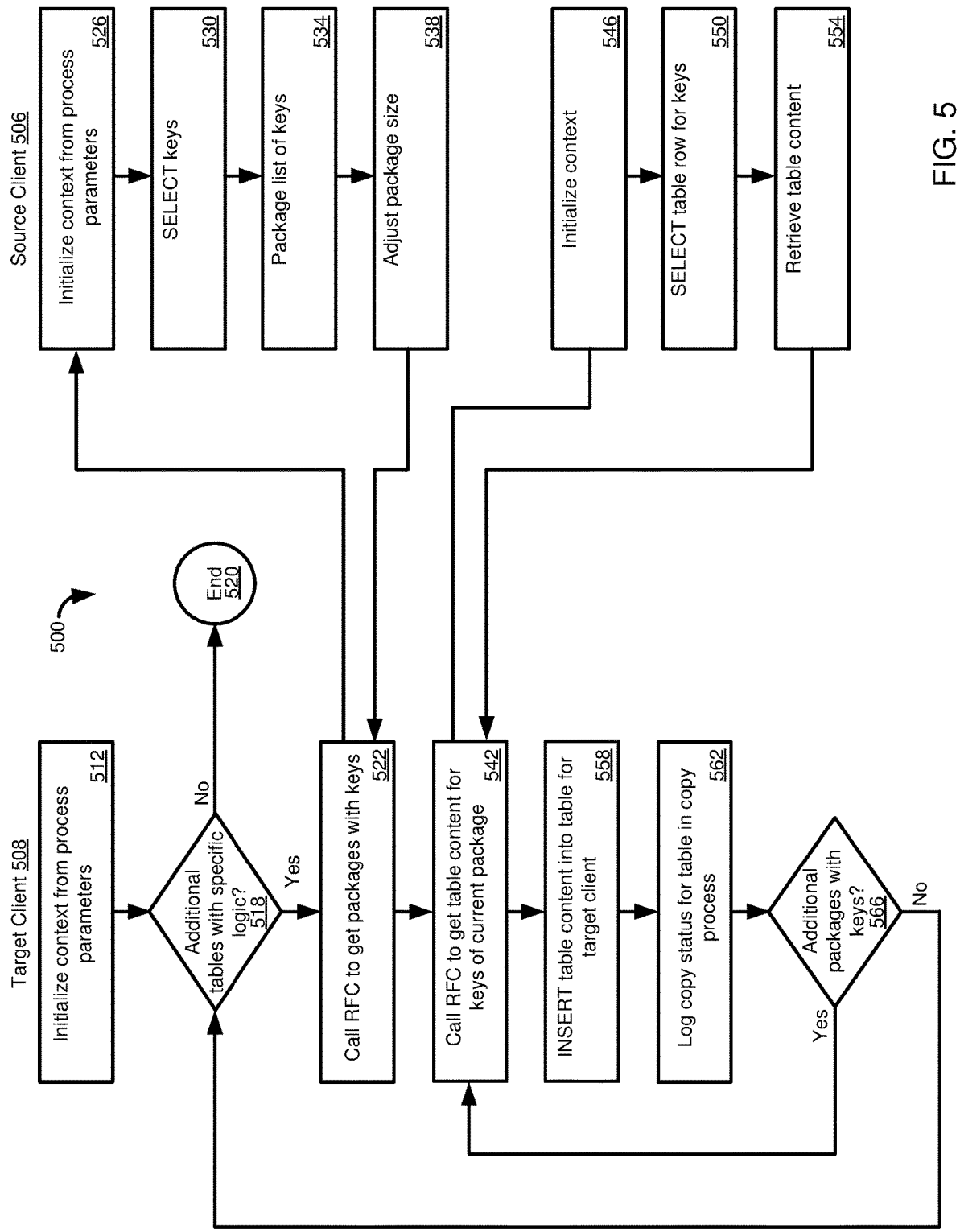
FIG. 5 is a flowchart illustrating activities at a source client and a target client during selection of data to be copied to the target client.

Example 6—Example Process for Sequentially Obtaining Relevant Keys and Data Associated Therewith FIG. 5 is a flowchart of a process 500 for copying data from a source client (or system) 506 to a target client (or system) 508. The process 500 can correspond to operations in the process 400 of FIG. 4. In particular, the operations of the process 500 can correspond to operations 430, 436, 458, 462, 466, 470, 474.

At 512 the target client 508 can initialize a copy process from parameters provided for a given copy process. Copy parameters can be provided by a copy service, such as the copy service 130 of FIG. 1. Copy parameters can include an identification of tables to be included in a copy process, and can include information indicating whether tables should be copied in full or in part, are associated with a particular table group, are associated with or contain attachments, and identifying any specific logic needed to process data in a table that will be partially copied.

The process 500 can represent operations in processing tables for which a partial copy has been specified. If a full copy has been specified, or a table does not have specific copy logic (and so may be copied in full by default), such a copy can occur by another process. For example, the copy process can involve selecting all data from a particular data source of the source client and inserting the data into a corresponding table at the target client.

At 518, the target client 508 can determine whether any tables remain to be copied that include specific logic (e.g., i.e., are to be partially copied). If not, the process 500 can end at 520. For example, an overall copy process can end if no more tables, in general, are to be copied, or the overall copy process can proceed to copy tables that are to be copied in their entirety.

If it is determined at 518 that additional tables remain to be processed using partial copy logic, a next table to be processed can be selected. The target client 508 can communicate with the source client 506 at 522 to obtain keys for data that meets copy criteria. As will be further explained, processing logic for a partial copy can be in the form of a SELECT statement for a table to be copied, where the SELECT statement includes conditions (e.g., WHERE conditions, JOIN conditions) that restrict data to that meeting copy criteria. The SELECT statement used at 522 can include operations (e.g., a projection) to return primary key values for rows of the table on the source system 506 meeting copy criteria.

At 526, the source client 506 can initialize a context from process parameters provided by the target client 508. In some cases, the context is initialized for each table that is to be evaluated at the source client 506. In other cases, the context is initialized a single time for a given overall copy process. Initializing the context at 526 can include receiving a SELECT statement, or other logic useable to determine data relevant to a copy process. Primary key values for data meeting copy criteria are obtained at 530, which can include executing a SELECT statement formulated as previously discussed.

At 534, the primary keys can be packaged into units that can be requested by the target client 508. In some implementations, the package size can be fixed. For example, a set number (or maximum number) of keys can be defined to be included in a package. Optionally, at 538, package sizes can be configured to satisfy particular size criteria. That is, depending on how many records are associated with files, and the size of the files, the size of a package can vary substantially. In order to better utilize computing resources (e.g., a network connection), package sizes can be adjusted at 538 to be under a specified size threshold, or within a specified size range, with can result in different packages having different numbers of keys. Optionally, 538 can be performed in place of 534 (e.g., packages can be determined based on size in the first instance, rather than first defining them based on a number of keys, at least for packages that include file data).

The list of keys meeting copy criteria can be returned to the target client 508 after 534 or 538. The target client 508 can then begin processing packages. At 542, the target client 508 can request from the source client 506 data for keys in a first package being processed. The source client 506 can initialize a context for the request at 546, such as associating the request with a particular copy process and a particular target client 508 (e.g., to determine where/how data should be sent). The source client 506 can execute a SELECT statement for the requested keys at 550. Data responsive to the SELECT statement is retrieved at 554 and returned to the target client 508.

The target client 508 receives data sent by the source client 506 at 554. At 558, the target client 508 executes an INSERT operation to store the received data into a corresponding table at the target client. The result of processing the data received from the source client 506 can be logged at 562. Logging can be useful to track the progress of a copy operation, including to determine a next action to be taken, or in the event the copy process is interrupted. Logging can also be useful if it is desired to delete data associated with a given copy process, such as when the copy is no longer needed.

At 566, it is determined whether any additional packages with keys remain to be retrieved from the source system 506 for a particular table being processed. If so, the process 500 can return to 542 to fetch a next package. If not, the process 500 can return to 518 to determine whether additional tables remain to be processed.

Example 7—Example User Interface Screens for Selecting Copy Mode

Figure 6B:
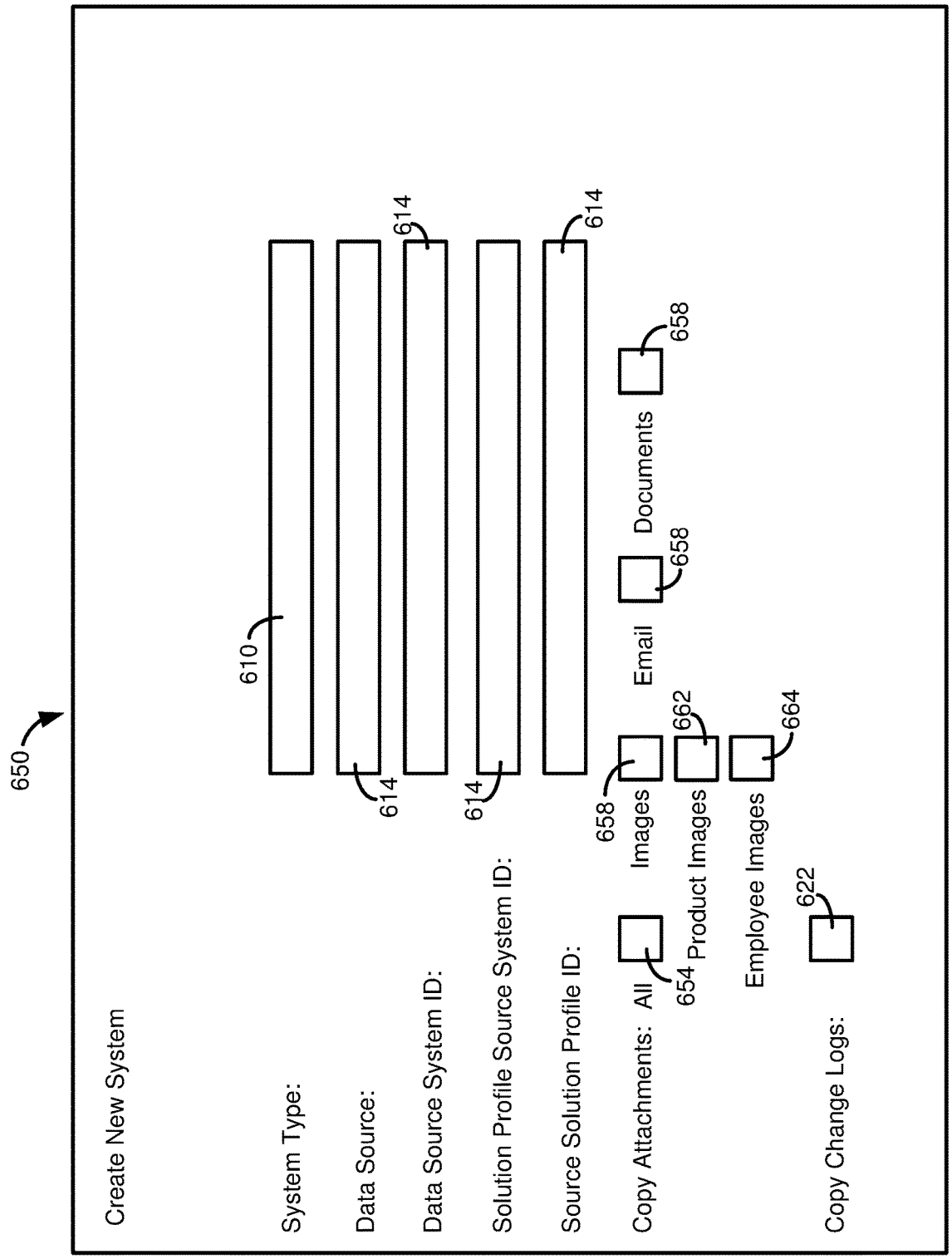

FIG. 6A is an example user interface screen 600 that can allow a user to define, and optionally initiate, a copy process. The user interface screen 600 includes an input element 610 that allows a user to specify a type for the new (target) system, such as whether the system is to be used for testing or production. Input elements 614 allow a user to specify a source system from which data is to be obtained. An input element 618 allows a user to select whether all attachments (files) from the source system will be copied. That is, the default copy action is a partial copy where at least certain types of attachments are not included in a copy. Typically, the partial copy include logic such that some attachments are included in the copy, but others are not.

In a similar manner, an input element 622 allows a user to select whether to include change logs in a copy. As with copying of attachments, the user interface screen 600 is consistent with a copy process where change logs are not copied by default.

In the event change logs are not to be copied, a suitable indication can be stored in a definition for a copy process, and can be sent to a source or target client. When determining tables to copy, such as at 446 of FIG. 4, tables associated with change logs can be omitted from a copy unless a user (or process) has indicated that change logs should be copied.

The screen 600 can represent a situation where copy logic for a partial copy has been predefined. The copy logic can represent fixed or default logic, or can be custom logic that was already specified by a user in another manner. In contrast, user interface screen 650 of FIG. 6B can represent an implementation where a user can input parameters to be used in a copy process—specifying particular types of attachments to be copied. Typically, unselected attachments will not be copied. However, a copy process can include logic such that attachments in addition to those specified by a user are automatically copied. However, such automatically copied attachments are typically not presented on the screen 650 as selectable options.

The screen 650 can have aspects similar to the screen 600, including input elements 610, 614, 622. However, rather than having a single input element 618 indicating whether a full or partial copy should be made, the screen 650 presents more granular options to a user. By selecting an input element 654, a user can select to copy all attachments. Input elements 658 allow a user to select general categories of attachments to include in a copy, such as images, emails, or documents. The general categories, in some cases, can be associated with file types (e.g., logic used to implement a copy process may associate a selection of "images" with file extensions such as ".jpg", ".gif", ".png").

As discussed with respect to the schema 300 of FIG. 3, in at least some cases it can be advantageous to allow users to more granularly select what kinds of attachments to include in a copy. The screen 650 illustrates one way of implementing this functionality, where, in addition to an input element 658 to select all images for copying, a user can select to restrict copied images to product images and/or employee images by selecting corresponding input elements 662, 664.

Example 8—Example Table Storing Table Logic and Group Information

As discussed, including in Example 1, in at least some cases it can be useful to process tables of a source client in groups, where a group can be associated with logic to help determine what/how data should be copied, including so that the copied tables remain consistent. For example, if a row associated with an attachment is not copied for one table, rows of other tables that reference that row should also not be copied.

FIG. 7 illustrates a table 700 that can be used to store information for tables associated with at least a portion of a copy process. In some cases, the table 700 can store information for all tables associated with a copy process, including tables that will be partially copied and tables that will be completely copied. In other cases, the table 700 can be specific for tables that will be partially copied.

The table 700 includes a field 710 that provides a name for a table that is included in a copy process. If the table associated with a given record 714 (shown as records 714a-714h) is associated with a group, that group can be listed in a field 718. As shown, it can be seen that the table 700 includes records 714 for three groups. Records 714a, 714b, 714c are associated with a group "ATT", records 714d, 714e are associated with a group "ATT1", and records 714f, 714g, 714h are associated with a group "ATT2."

In a specific embodiment, groups can be used to help ensure that groups of related tables are either copied in full or in part. If copied in part, groups can also be used to help ensure that consistent copy logic is applied to tables in the group. For example, if a first table in a group was copied entirely, but a second table referenced by the first table was copied in part, there could be records in the first table where corresponding data is not present in a copy of the second table. In a similar manner, having different copy logic (e.g., including/excluding different kinds of files) can result in the first table having references to records that were not copied for the second table. Groups can be used to set particular ranges (e.g., of key values) where a partial copy process may be used, and ranges where a full copy can be used.

Field 722 provides classes that provide logic for performing partial copies of a given table (e.g., corresponding to a particular record 714). That is, in some implementations, logic to perform partial table copies can be implemented as an abstract data type, or similar programming object. The classes can be derived classes of a base class that defines interfaces for table-processing logic. Each class can include appropriate methods to process a given table, such as SQL statements that can be used to determine records that are responsive to a given query, request those records from a source client, and insert the records in a target client.

Field 726 specifies a field of a data structure of a target client that has the same data format as a database table of the source client from which data is being transferred. Specifying a field using field 726 can speed data transfer, such as by allowing data to be transferred between the source and target in a structured data type without the need to serialize the data.

Example 9—Example Query Language Statements

FIG. 8 provides example query language statements (e.g., in SQL, which can be included in other code, such as ABAP code) that can be used to select keys that should be included in data copied from a source client to a target client. Query language statement 800 represents a generic selection statement. The query language statement 800 includes a placeholder 806 for a primary key field (or fields), a placeholder 808 for a table name from which keys are being selected, and a placeholder 812 for a table name in which document types (or properties) to be copied are provided. A JOIN is executed on tables 808 and 812 in retrieving responsive records. The JOIN condition itself is associated with a placeholder 816, as the appropriate join conditions (fields) are determined based on the tables 808, 812, and thus may need to be manually implemented, or otherwise specifically implemented for a given table from which keys are being selected.

Document types to be copied can be determined from parameters for a given copy process, and can be inserted into a placeholder 820 for a WHERE clause in the query language statement 800. The WHERE clause can optionally contain additional conditions (e.g., restricting a particular file type to files associated with particular metadata), which additional conditions can be inserted into placeholder 824.

In some cases, such as when source tables are part of a multitenant database system, a client can be specified for a placeholder 828. For example, an identifier for a client whose data is being copied can be inserted for the placeholder 828, and can be used to limit data retrieved from the table specified in the placeholder 808 to data associated with that client identifier.

Query language statement 850 represents a particular implementation of the query language statement 800, where the placeholders 806, 808, 812, 816, 820, 824 have been replaced with particular values. In particular, it can be seen that placeholder 824 includes an additional condition, limiting responsive records to those associated with a specified version.

FIG. 9 provides example query language statements (e.g., in SQL, which can be included in other code, such as ABAP code) that can be used to retrieve records for selected keys retrieved using an implementation of the SQL statement 800 of FIG. 8. Query language statement 900 represents a generic statement, with placeholders for values specific to specific tables. Placeholder 908 specifies a table from which data is being retrieved, and placeholder 912 specifies a specific client whose data is retrieved (i.e., analogous to placeholder 828).

The query language statement 900 includes a JOIN condition, joining the table provided in placeholder 908 with a table that includes a list of keys, which can be keys for a specific package. Note that since a selection condition (e.g., placeholders 820, 824 of the query language statement 800) was already executed in selecting the keys via a version of the query language statement 800, such selection conditions need not be included in the query language statement 900. Query language statement 950 provides a specific implementation of the query language statement 900, with values provided for the placeholder 908.

FIG. 10 provides example query language statements (e.g., in SQL, which can be included in other code, such as ABAP code) that can be used to insert records provided by a source client into tables at a target client. Query language statement 1000 represents a generic INSERT statement, with a placeholder 1010 for a table into which the data will be inserted. Query language statement 1050 represents a specific INSERT statement, with a value provided for the placeholder 1010.

Note that the query language statements 1000, 1050 include a statement to accept duplicate keys. This can be useful in the event a copy process fails, and is resumed, and the copy process does not include logic to determine what data was copied prior to process failure.

Example 10—Example Copy Operations

Figures 11A, 11B:
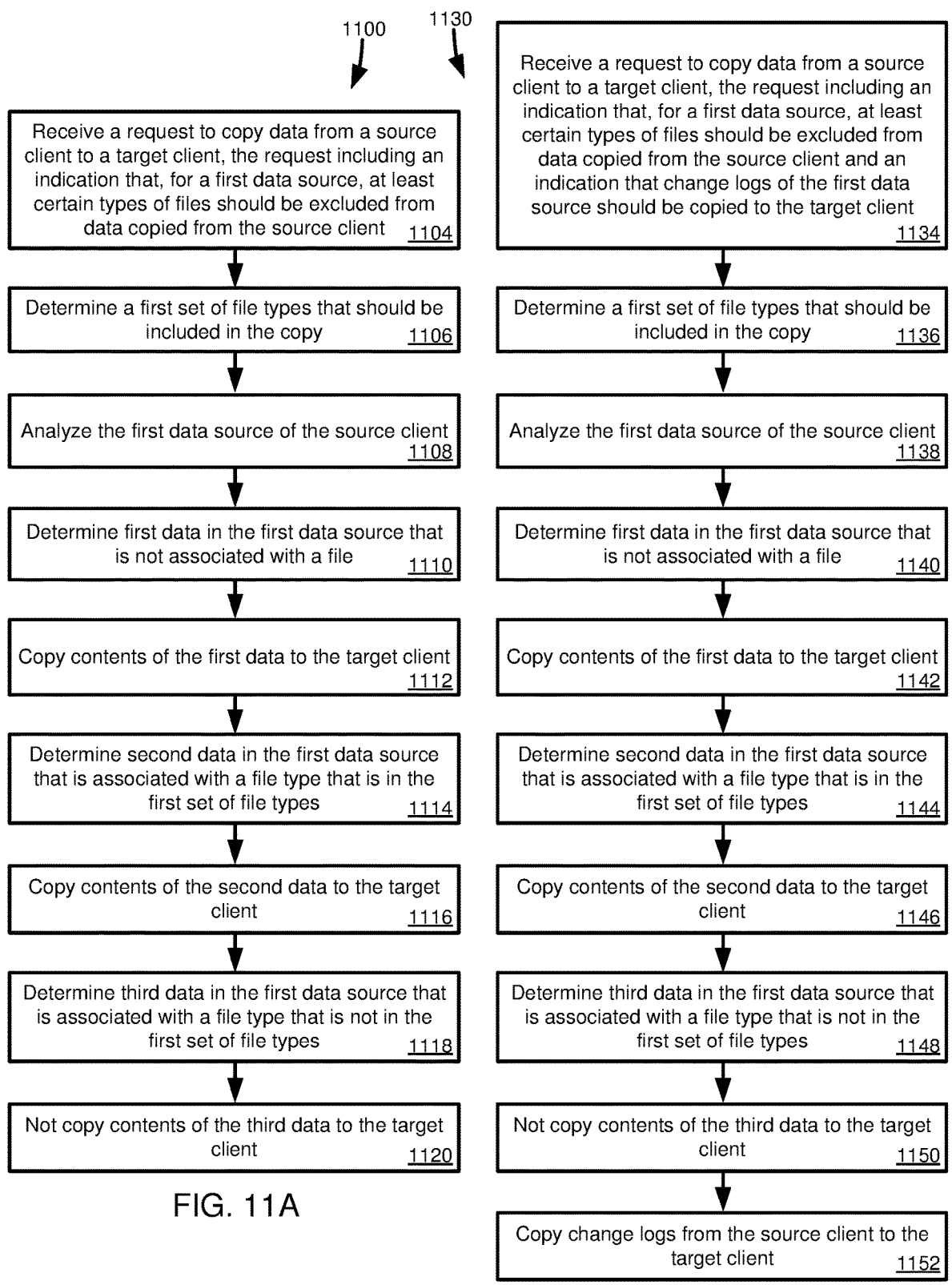
FIGS. 11A-11C are flowcharts of example methods for selectively copying data from a source client to a target client.

FIG. 11A is a flowchart of an example method 1100 of copying selected data from a source client to a target client. The method 1100 can be carried out using the computing environment 100 of FIG. 1, the computing environment 200 of FIG. 2A, or the computer environment 250 of FIG. 2B, and can use processes 400 or 500 of FIGS. 4 and 5, as well as the technologies described in any of Examples 1-9.

At 1104, a request is received to copy data from a source client to a target client to provide a copy of at least a portion of data stored for the source client. The request includes an indication that, for a first data source associated with the source client, at least certain types of files should be excluded from data copied from the source client.

A first set of file types that should be included in the copy is determined at 1106. At 1108, the first data source of the source client is analyzed. First data in the first data source that is not associated with a file is determined at 1110. At 1112, contents of the first data are copied to the target client. Second data in the first data source that is associated with a file type that is in the first set of file types is determined at 1114. At 1116, contents of the second data are copied to the target client. Third data in the first data source that is associated with a file type that is not in the first set of file types is determined at 1118. At 1120, contents of the third data are not copied to the target client.

FIG. 11B is a flowchart of another example method 1130 of copying selected data from a source client to a target client. The method 1130 can be carried out using the computing environment 100 of FIG. 1, the computing environment 200 of FIG. 2A, or the computer environment 250 of FIG. 2B, and can use processes 400 or 500 of FIGS. 4 and 5, as well as the technologies described in any of Examples 1-9.

At 1134, a request is received to copy data from a source client to a target client to provide a copy of at least a portion of data stored for the source client. The request includes an indication that, for a first data source associated with the source client, at least certain types of files should be excluded from data copied from the source client. The request also includes an indication that change logs should be included in data copied from the source client to the target client, which overrides a default action of not copying change logs.

A first set of file types that should be included in the copy is determined at 1136. At 1138, the first data source of the source client is analyzed. First data in the first data source that is not associated with a file is determined at 1140. At 1142, contents of the first data are copied to the target client. Second data in the first data source that is associated with a file type that is in the first set of file types is determined at 1144. At 1146, contents of the second data are copied to the target client. Third data in the first data source that is associated with a file type that is not in the first set of file types is determined at 1148. At 1150, contents of the third data are not copied to the target client. Change logs are copied from the source client to the target client at 1152.

Figure 11C:
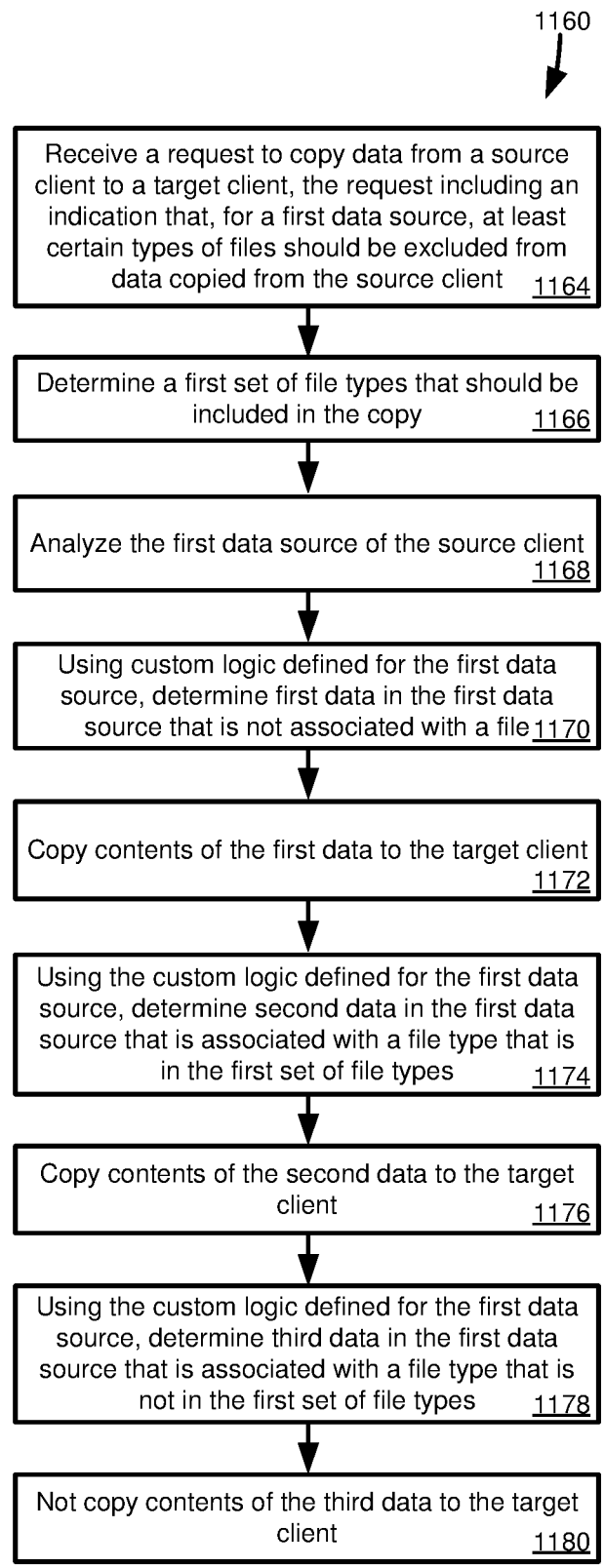

FIG. 11C is a flowchart of a further example method 1160 of copying selected data from a source client to a target client. The method 1160 can be carried out using the computing environment 100 of FIG. 1, the computing environment 200 of FIG. 2A, or the computer environment 250 of FIG. 2B, and can use processes 400 or 500 of FIGS. 4 and 5, as well as the technologies described in any of Examples 1-9.

At 1164, a request is received to copy data from a source client to a target client to provide a copy of at least a portion of data stored for the source client. The request includes an indication that, for a first data source associated with the source client, at least certain types of files should be excluded from data copied from the source client.

A first set of file types that should be included in the copy is determined at 1166. At 1168, the first data source of the source client is analyzed. First data in the first data source that is not associated with a file is determined at 1170, using custom logic defined for the first data source. At 1172, contents of the first data are copied to the target client. Second data in the first data source that is associated with a file type that is in the first set of file types is determined at 1174, using the custom logic defined for the first data source. At 1176, contents of the second data are copied to the target client. Third data in the first data source that is associated with a file type that is not in the first set of file types is determined at 1178, using the custom logic defined for the first data source. At 1180, contents of the third data are not copied to the target client.

Example 11—Computing Systems

Figure 12:
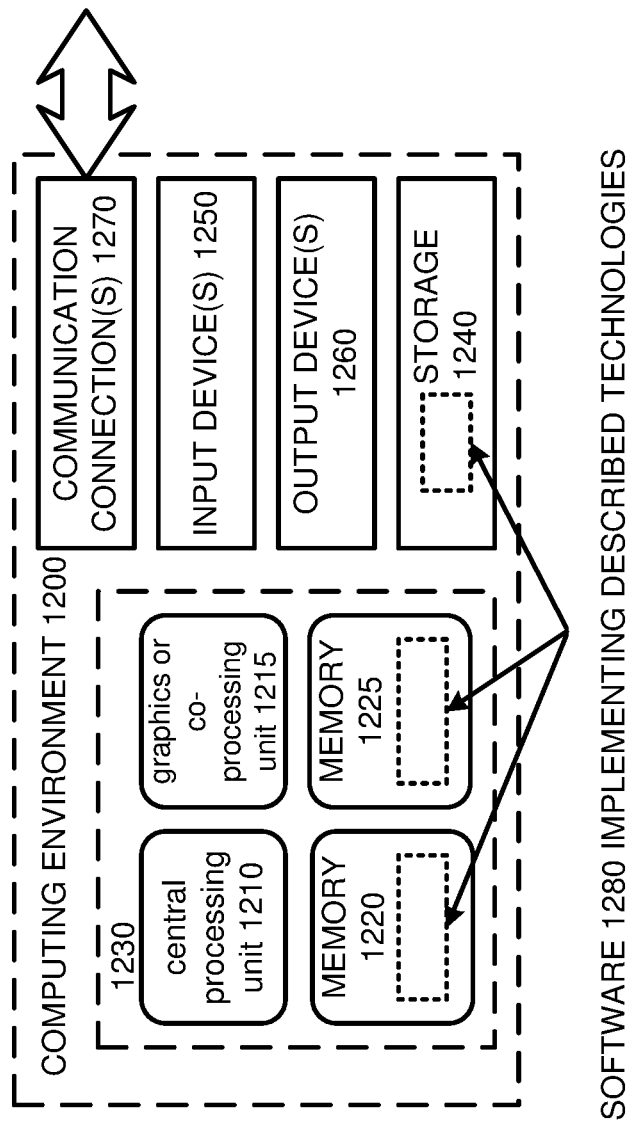
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing the technologies described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way, and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 13:
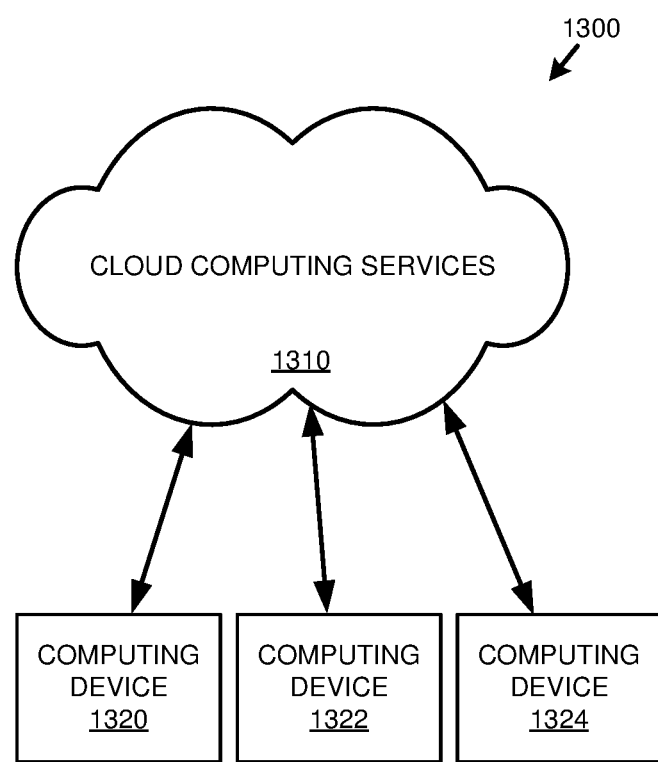
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
memory;
one or more hardware processing units coupled to the memory; and
one or more computer readable storage media storing instructions that, when executed, cause the computing system to perform operations comprising:
receiving a request to copy data from a source client to a target client to provide a copy of at least a portion of data stored for the source client, the request comprising an indication that, for a first data source, at least certain types of files should be excluded from data copied from the source client, wherein the data comprises structured or semi-structured data of a database system and one or more files linked to the structured or semi-structured data, wherein the structured or semi-structured data of the database system comprises a reference to one or more of a location of the one or more files or a file identifier of the one or more files, wherein the structured or semi-structured data further comprises data other than the reference to the one or more of the location or the file identifier;
determining a first set of file types that should be included in the copy;
analyzing the first data source of the source client;
determining first structured or semi-structured data in the first data source that is not associated with a file, the first structured or semi-structured data not including the reference to the one or more of the location of the one or more files or the file identifier of the one or more files;
copying contents of the first structured or semi-structured data to the target client;
determining second structured or semi-structured data in the first data source that is associated with a file type that is in the first set of file types, the second structured or semi-structured data including the reference to the one or more of the location of the one or more files or the file identifier of the one or more files;
copying contents of the second structured or semi-structured data to the target client;
copying files linked to the second structured or semi-structured data and having a file type that is in the first set of file types to the target client;
determining third structured or semi-structured data in the first data source that is associated with a file type that is not in the first set of file types, the third structured or semi-structured data including the reference to the one or more of the location of the one or more files or the file identifier of the one or more files;
copying contents of the third structured or semi-structured data to the target client; and
not copying contents of files having a file type that is not in the first set of file types to the target client.

2. The computing system of claim 1, wherein copying the first structured or semi-structured data to the target client comprises:
determining identifiers for the first structured or semi-structured data;
partitioning identifiers for the first structured or semi-structured data into a plurality of packages; and
on a package-by-package basis, copying first structured or semi-structured data from the source client to the target client.

3. The computing system of claim 2, wherein the identifiers comprise primary key values.

4. The computing system of claim 2, wherein partitioning identifiers for the first structured or semi-structured data into a plurality of packages comprises:
determining a size for a given package of the plurality of packages;
determining that the size satisfies a threshold; and
removing one or more identifiers from the package to provide a revised package size for the given package, the revised package size not satisfying the threshold.

5. The computing system of claim 4, wherein the determining a size and removing one or more identifiers are carried out if it is determined that data in the package comprises file data.

6. The computing system of claim 1, wherein the source client is a first tenant of a multitenant database system comprising a plurality of tenants.

7. The computing system of claim 1, wherein the set of file types is a default set of file types.

8. The computing system of claim 1, wherein the set of file types is based at least in part on user input received in generating the request to copy data.

9. The computing system of claim 1, wherein the request to copy data further comprises an indication that data copied should include change logs, wherein change logs are otherwise not copied from the source client.

10. The computing system of claim 1, wherein the set of file types comprises one or more file extensions, and wherein the contents of the third structured or semi-structured data copied to the target client comprise the data other than the reference to the one or more of the location or the file identifier.

11. The computing system of claim 1, wherein the set of file types comprises one or more metadata values for one or more metadata element types.

12. The computing system of claim 11, wherein determining second structured or semi-structured data comprises comparing the one or more metadata values with metadata values of the first data source.

13. The computing system of claim 1, wherein the set of file types is based at least in part on input provided by an application that generated the request to copy data.

14. The computing system of claim 1, wherein the source client comprises at least second and third data sources, the second and third data sources being assigned to at least a first group, the second data source is associated with an indication that the at least certain types of files should not be copied, the third data source is not associated with an indication that the at least certain types of files should not be copied and the at least certain types of files are copied or not copied for both the second and third data sources.

15. The computing system of claim 1, wherein the first data source is associated with processing logic specific to the first data source to determine the second structured or semi-structured data.

16. The computing system of claim 15, wherein the processing logic comprises a SELECT statement in a query language.

17. The computing system of claim 1, wherein the request to copy data is applied to at least a second data source, processing logic for determining data of the second data source associated with the first set of files types is not defined for the at least a second data source, and the operations further comprise:
copying all data of the at least a second data source to the target client.

18. The computing system of claim 1, wherein the first set of files types are a proper subset of a second set of file types, the first and second sets of file types being part of a common general class of files.

19. One or more computer-readable storage media comprising:
computer-executable instructions that, when executed by a computing system comprising at least one hardware processor and at least one memory coupled to the at least one hardware processor, cause the computing system to receive a request to copy data from a source client to a target client to provide a copy of at least a portion of data stored for the source client, wherein the data comprises structured or semi-structured data of a database system and one or more files linked to the structured or semi-structured data, the structured or semi-structured data of the database system comprising a reference to one or more of a location of the one or more files or a file identifier of the one or more files, the structured or semi-structured data further comprising data other than the reference to the one or more of the location or the file identifier, the request comprising an indication that (1) for a first data source, at least certain types of files should be excluded from data copied from the source client, and (2) change logs should be included in data copied from the source client to the target client, the indication that change logs should be included in data copied from the source client overriding a default action of not copying change logs;

computer-executable instructions that, when executed, cause the computing system to determine a first set of file types that should be included in the copy;

computer-executable instructions that, when executed, cause the computing system to analyze the first data source of the source client;

computer-executable instructions that, when executed, cause the computing system to determine first structured or semi-structured data in the first data source that is not associated with a file, the first structured or semi-structured data not including the reference to the one or more of the location of the one or more files or the file identifier of the one or more files;

computer-executable instructions that, when executed, cause the computing system to copy contents of the first structured or semi-structured data to the target client;

computer-executable instructions that, when executed, cause the computing system to determine second structured or semi-structured data in the first data source that is associated with a file type that is in the first set of file types, the second structured or semi-structured data including the reference to the one or more of the location of the one or more files or the file identifier of the one or more files;

computer-executable instructions that, when executed, cause the computing system to copy contents of the second structured or semi-structured data to the target client;

computer-executable instructions that, when executed, cause the computing system to copy files linked to the second structured or semi-structured data and having a file type that is in the first set of file types to the target client;

computer-executable instructions that, when executed, cause the computing system to determine third structured or semi-structured data in the first data source that is associated with a file type that is not in the first set of file types, the third structured or semi-structured data including the reference to the one or more of the location of the one or more files or the file identifier of the one or more files;

computer-executable instructions that, when executed, cause the computing system to not copy contents of files having a file type that is not in the first set of file types to the target client;

computer-executable instructions that, when executed, cause the computing system to copy contents of the third structured or semi-structured data to the target client; and computer-executable instructions that, when executed, cause the computing system to, based on the indication that change logs should be included in the copy, copy change logs from the source client to the target client.

20. A method, implemented in a computing system comprising a memory and one or more hardware processors coupled to the memory, comprising:
receiving a request to copy data from a source client to a target client to provide a copy of at least a portion of data stored for the source client, the request comprising an indication that, for a first data source, at least certain types of files should be excluded from data copied from the source client, wherein the data comprises structured or semi-structured data of a database system and one or more files linked to the structured or semi-structured data, wherein the structured or semi-structured data of the database system comprises a reference to one or more of a location of the one or more files or a file identifier of the one or more files, wherein the structured or semi-structured data further comprises data other than the reference to the one or more of the location or the file identifier;

determining a first set of file types that should be included in the copy;

analyzing the first data source of the source client;

using custom logic defined for the first data source, determining first structured or semi-structured data in the first data source that is not associated with a file, the first structured or semi-structured data not including the reference to the one or more of the location of the one or more files or the file identifier of the one or more files;

copying contents of the first structured or semi-structured data to the target client;

using the custom logic defined for the first data source, determining second structured or semi-structured data in the first data source that is associated with a file type that is in the first set of file types, the second structured or semi-structured data including the reference to the one or more of the location of the one or more files or the file identifier of the one or more files;

copying contents of the second structured or semi-structured data to the target client;

copying files linked to the second structured or semi-structured data and having a file type that is in the first set of file types to the target client;

using the custom logic defined for the first data source, determining third structured or semi-structured data in the first data source that is associated with a file type that is not in the first set of file types, the third structured or semi-structured data including the reference to the one or more of the location of the one or more files or the file identifier of the one or more files;

copying contents of the third structured or semi-structured data to the target client; and not copying contents of files having a file type that is not in the first set of file types to the target client.

* * * * *